United States Patent Office 3,229,407
Patented Jan. 18, 1966

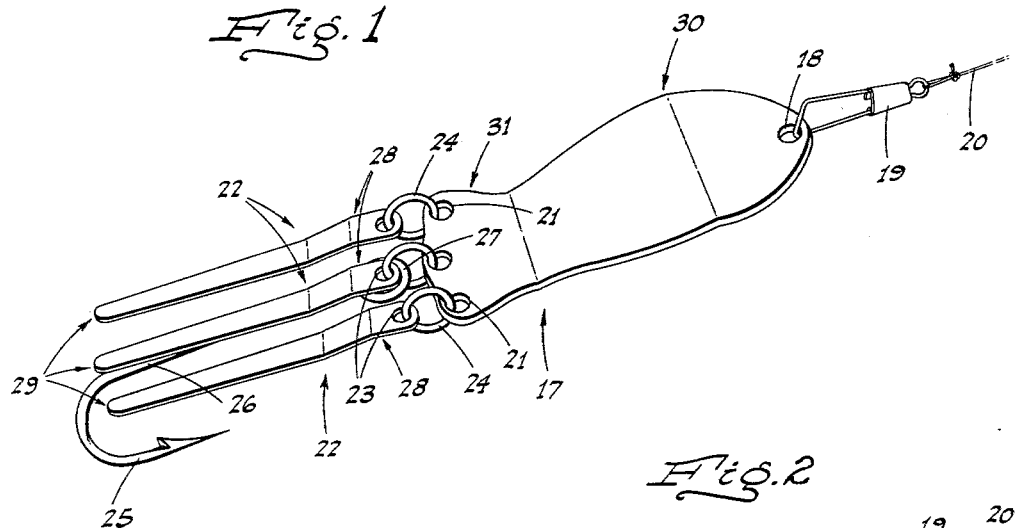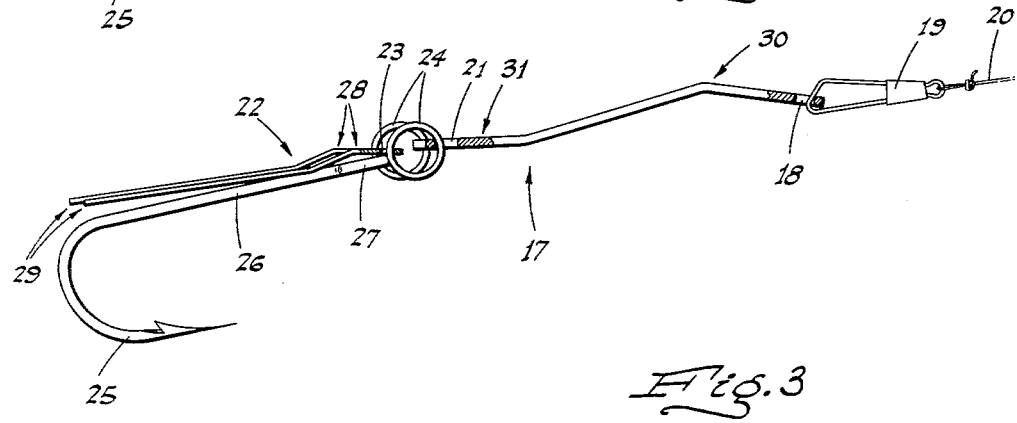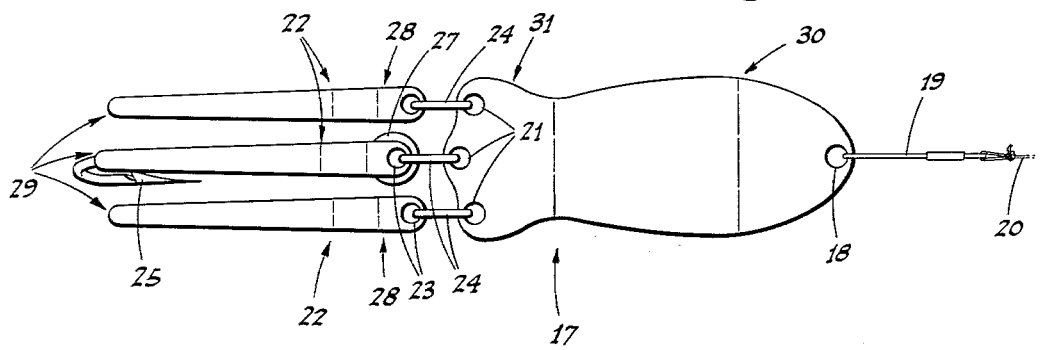

3,229,407
FISHING LURE
Martin E. Quyle, Stockton, Calif., assignor to Lectrolure Company, Inc., Stockton, Calif., a corporation of California
Filed Apr. 13, 1964, Ser. No. 359,339
1 Claim. (Cl. 43—42.18)

This invention is directed to and it is a major object to provide a fishing lure embodying a novel form of attractor blade; the lure, as drawn through the water by a line and by reason of the inclusion of such attractor blade, having an effective game fish attracting action which closely simulates the motion of a live swimming minnow.

Another important object of this invention is to provide, in a fishing lure, an attractor blade in the form of a shiny metallic flasher strip having a forward or nose section and a rearward or tail section; the nose section being of a particular shape and disposition relative to the tail section whereby to cause the lure, when in use, to wiggle from side to side but without undesirable spinning.

Still another important object of the invention is to provide, in a fishing lure, an attractor blade which is well adapted for use plurally in a multi-blade lure.

An additional object of the invention is to provide a fishing lure, including such novel attractor blade, which is useful for both trolling and casting; the lure, when pulled through the water at proper speed, remaining substantially at the selected running depth and without any tendency to dive or surface.

It is also an object of the invention to provide a fishing lure, including said novel attractor blade, which functions as intended and desired regardless of the size in which the lure is produced.

A further object of the invention is to provide a fishing lure which is designed for ease and economy of manufacture.

A still further object of the invention is to provide a practical, reliable, and durable fishing lure and one which is exceedingly effective for the purpose for which it is designed.

These objects are accomplished by means of such structure and relative arrangement of parts as will fully appear by a perusal of the following specification and claim.

In the drawings:

FIG. 1 is a perspective view of a multi-blade lure, embodying the present invention, as in use.

FIG. 2 is a side elevation, partly in section, of the lure shown in FIG. 1.

FIG. 3 is a top plan view of the same.

Referring now more particularly to the drawings and to the characters of reference marked thereon, the multi-blade lure illustrated comprises a shiny metallic primary attractor blade 17 formed at the front end with a central hole 18 for reception of a snap 19 by means of which the lure is connected to a line or leader 20.

At its rear end, the primary attractor blade 17 is formed with a plurality of transversely spaced holes 21; there being three of such holes in the present embodiment in symmetrically or equally spaced relation.

A separate shiny metallic secondary attractor blade 22 trails the primary attractor blade 17 rearwardly of and corresponding to each of the holes 21. There are, thus, three of such secondary attractor blades, and each is formed at the front with a central hole 23 for the reception of a small ring 24 which also extends through the corresponding hole 21 whereby to connect the related secondary attractor blade 22 to the primary attractor blade 17.

A downwardly extending forwardly facing hook 25 is disposed below the intermediate secondary attractor blade 22, and such hook includes a forwardly extending shank 26 having an eye 27 on its forward end; the related ring 24 also extending through such eye 27 whereby to connect the hook 25 in trailing relation to the primary attractor blade 17.

Each of the secondary attractor blades 22 has a novel configuration which includes a nose section 28 of inverted relatively widely open V-shape in side elevation and a straight elongated tail section 29; each blade 22 being transversely flat from end to end thereof, and with the front end of the nose section above the longitudinal plane of the tail section.

The secondary attractor blades 22 thus have a wiggling action when the multi-blade lure is drawn through the water; such secondary attractor blades 22 producing a multiple flashing effect.

Also, the primary attractor blade 17 acts much the same as the secondary blades 22 and, of itself, wiggling from side to side as the multi-blade lure runs in the water. This, of course, is due to the fact that the primary attractor blade 17 includes a nose section 30 of inverted relatively widely open V-shape and a straight tail section 31 extending rearwardly from said nose section 30; the blade 17 being transversely flat from end to end and the front end of said nose section 30 being above the longitudinal plane of the tail section 31.

From the foregoing description, it will be readily seen that there has been produced such a fishing lure as substantially fulfills the objects of the invention, as set forth herein.

While this specification sets forth in detail the present and preferred construction of the fishing lure, still in practice such deviations from such detail may be resorted to as do not form a departure from the spirit of the invention, as defined by the appended claim.

Having thus described the invention, the following is claimed as new and useful and upon which Letters Patent is desired:

In a fishing lure embodying a primary longitudinal attractor blade trailing a hook from the rear end, and a plurality of transversely spaced secondary longitudinal attractor blades disposed in transversely spaced relation rearwardly of said primary attractor blade; each of said secondary attractor blades comprising an elongated rigid strip having a nose section and a tail section; the nose section being of inverted relatively widely open V-shape in side elevation, and the tail section being elongated relative to the nose section and straight in side elevation, and means swivelly connecting the front ends of the secondary attractor blades with the rear end of said primary attractor blade for limited rotative movement only.

References Cited by the Examiner
UNITED STATES PATENTS

| | | | |
|---|---|---|---|
| 1,638,215 | 8/1927 | Rodgers | 43—42.52 X |
| 1,997,802 | 4/1935 | Meyer | 43—42.13 |
| 2,527,743 | 10/1950 | LaRue | 43—42.52 X |
| 2,588,720 | 3/1952 | Heiland | 43—42.5 |
| 2,959,883 | 11/1960 | Smith et al. | 43—42.5 |

FOREIGN PATENTS 629,515   10/1961   Canada.

SAMUEL KOREN, Primary Examiner.

ABRAHAM G. STONE, Examiner.

UNITED STATES PATENT OFFICE
CERTIFICATE OF CORRECTION

Patent No. 3,229,407                             January 18, 1966

Martin E. Quyle

It is hereby certified that error appears in the above numbered patent requiring correction and that the said Letters Patent should read as corrected below.

In the grant, lines 2 and 3, for "assignor to Lectrolure Company, Inc., of Stockton, California, a corporation of California," read -- assignor of one-half to Lectrolure Company, Inc., of Stockton, California, a corporation of California, --; line 12, for "Lectrolure Company, Inc., its successors" read -- Martin E. Quyle, his heirs or assigns and Lectrolure Company, Inc., its successors --; in the heading to the printed specification, lines 3 to 5, for "assignor to Lectrolure Company, Inc., Stockton, Calif., a corporation of California" read -- assignor of one-half to Lectrolure Company, Inc., Stockton, Calif., a corporation of California --.

Signed and sealed this 7th day of June 1966.

(SEAL)
Attest:

ERNEST W. SWIDER                                         EDWARD J. BRENNER
Attesting Officer                                      Commissioner of Patents